United States Patent
Cook (10) Patent No.: US 10,855,047 B1
(45) Date of Patent: Dec. 1, 2020

(54) PASSIVELY CAVITY-DUMPED LASER APPARATUS, SYSTEM AND METHODS

(71) Applicant: Government of the United States, as represented by the Secretary of the Air Force, Wright-Patterson AFB, OH (US)

(72) Inventor: Gary Cook, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 16/181,515

(22) Filed: Nov. 6, 2018

(51) Int. Cl.
| | |
|---|---|
| *H01S 3/11* | (2006.01) |
| *H01S 3/117* | (2006.01) |
| *H01S 3/109* | (2006.01) |
| *H01S 3/115* | (2006.01) |
| *H01S 3/08* | (2006.01) |

(52) U.S. Cl.
CPC ........ *H01S 3/1103* (2013.01); *H01S 3/08059* (2013.01); *H01S 3/109* (2013.01); *H01S 3/115* (2013.01); *H01S 3/117* (2013.01); *H01S 3/1115* (2013.01)

(58) Field of Classification Search
CPC ........ H01S 3/1103; H01S 3/115; H01S 3/113; H01S 3/11–127
See application file for complete search history.

(56) References Cited

U.S. PATENT DOCUMENTS

| | | | | |
|---|---|---|---|---|
| 3,492,492 A | * | 1/1970 | Lenzo | .......... G02F 1/0126 250/225 |
| 3,810,688 A | * | 5/1974 | Ballman | .......... G02F 1/035 385/2 |

(Continued)

FOREIGN PATENT DOCUMENTS

| | | |
|---|---|---|
| CA | 1228148 | 10/1987 |
| EP | 0142815 | 11/1984 |

(Continued)

OTHER PUBLICATIONS

Myers J, Kokoczka C, Cook G, Bedford R. High peak power cavity dumping semiconductor lasers. Opt Lett. 2017;42 (1):113-116.

*Primary Examiner* — Joshua King
(74) *Attorney, Agent, or Firm* — AFMCLO/JAZ; Jeffrey Moore (57) ABSTRACT

Systems and methods for employing an electro-optic and photoconductive optical element operating in combination with a polarizer and 100% reflective mirrors to passively control dumping of power from a resonator. The optical element may be constructed of electro-optic material (e.g., Bismuth Silicon Oxide (BSO), Bismuth Germanium Oxide (BGO)), the refractive index of which may be altered by the application of an externally applied electric field. The presence of incident light changes the photoconductivity of the optical element and, therefore, also changes the polarization state of the light passing through the optical element. When combined with a conventional polarizer, the device acts as a self-triggering optical valve to suddenly divert the path of light within a laser to outside of the normal resonator path. Optical power that has been stored inside the laser resonator is then dumped out of the laser in a single, very-high power pulse.

22 Claims, 4 Drawing Sheets

(56) References Cited

U.S. PATENT DOCUMENTS

| | | | |
|---|---|---|---|
| 3,831,153 A | 8/1974 | Oliver | |
| 4,594,715 A | 6/1986 | Knollenberg | |
| 4,900,150 A | 2/1990 | Hall | |
| 5,027,360 A | 6/1991 | Nabors | |
| 5,085,503 A * | 2/1992 | Osugi | G02F 1/0338 359/246 |
| 5,384,798 A * | 1/1995 | Zucker | G02F 1/0126 372/10 |
| 5,394,415 A | 2/1995 | Zucker | |
| 5,425,039 A | 6/1995 | Hsu | |
| 5,557,625 A | 9/1996 | Durville | |
| 5,848,080 A | 12/1998 | Dahm | |
| 5,994,687 A | 11/1999 | Chanteloup | |
| 6,137,812 A | 10/2000 | Hsu | |
| 6,263,004 B1 * | 7/2001 | Arvidsson | H01S 3/0627 372/11 |
| 7,280,569 B2 | 10/2007 | Laughman | |
| 7,907,644 B2 | 3/2011 | Kopf | |
| 9,252,560 B2 | 2/2016 | Fermann | |
| 9,306,368 B2 * | 4/2016 | Jonuska | G02F 1/0327 |
| 9,678,373 B2 | 6/2017 | Tournois | |
| 9,819,142 B2 | 11/2017 | Fermann | |
| 2002/0167974 A1 | 11/2002 | Kennedy | |
| 2004/0146075 A1 | 7/2004 | Kennedy | |
| 2005/0185682 A1 | 8/2005 | Jacinavicius | |
| 2006/0045150 A1 | 3/2006 | Newman | |
| 2006/0239610 A1 | 10/2006 | Hickey | |
| 2007/0280305 A1 | 12/2007 | Zucker | |
| 2010/0135341 A1 | 6/2010 | Grishin | |
| 2010/0225897 A1 | 9/2010 | Fermann | |
| 2012/0044960 A1 * | 2/2012 | Goldberg | H01S 3/115 372/12 |
| 2012/0081694 A1 | 4/2012 | Fermann | |
| 2015/0245870 A1 | 9/2015 | Sierra | |
| 2015/0300813 A1 | 10/2015 | Reitinger | |
| 2016/0097964 A1 | 4/2016 | Zheng | |
| 2017/0324212 A1 | 11/2017 | Jhon | |
| 2017/0365974 A1 | 12/2017 | Kurtz | |

FOREIGN PATENT DOCUMENTS

| | | |
|---|---|---|
| EP | 1679772 | 7/2006 |
| JP | 02308230 A * | 12/1990 |
| WO | WO2010101690 | 9/2010 |

* cited by examiner

PASSIVELY CAVITY-DUMPED LASER APPARATUS, SYSTEM AND METHODS

STATEMENT OF GOVERNMENT INTEREST

The invention described herein may be manufactured, used, and licensed by or for the Government of the United States for all governmental purposes without the payment of any royalty.

BACKGROUND

Pulsed lasers are known for high peak power generation. Pulsed operation may be achieved using a pulsed excitation source, such as a pulsed laser diode or a flashlamp. More commonly, substantially steady optical energy may be manipulated into pulsed operation by employing sudden changes to laser resonator quality, sometimes referred to as "Q-switching" or "mode locking". In both of these methods, energy is stored within a laser medium and periodically released suddenly in the form of a very high peak power pulse. Q-switching and mode locking generally involve placing a variable attenuator, such as a fast optical shutter, within the laser resonator to initially prevent the laser from operating. Blocking the laser resonator in this way prevents the build-up of light within the resonator that would otherwise continuously drain away the energy being deposited in the laser medium by the excitation source. Doing so allows appreciable energy to be stored in the laser medium until a "spontaneous emission lifetime" has been reached. The spontaneous emission lifetime is a measure of how long a given laser material is able to store energy before it radiates away through fluorescence.

Once appreciable energy has been stored in the material of the laser medium, the shutter may be suddenly opened to permit laser action within the resonator. Doing so may cause all the stored energy to be swept away into a sudden high peak power burst of energy. This extraction of stored energy is analogous to filling with water a bucket having a large hole in its base. Unless the hole is blocked (the resonator), the bucket cannot be filled. But once the bucket has been filled, the hole may be unblocked to allow release of all the stored water at once.

SUMMARY OF INVENTION

The present invention includes a cavity-dumping laser system comprising a plurality of mirrors defining a resonator characterized by a beam path. A laser gain medium positioned along a substantially-longitudinal axis of the resonator and configured to amplify optical energy received from at least one of an excitation source and the plurality of mirrors to form within the beam path a stored optical energy having a variable optical intensity. An optical element positioned within the beam path of the resonator, and comprising a crystal configured to receive an electric field in an illuminated portion of the crystal proximate the beam path, defined as an illuminated path and create in a first light wave of the stored optical energy, using an electro-optic property of the crystal as applied to the electric field, an initial polarization state. Create, based on a photoconductive property of the crystal as applied to an absorbed portion of the stored optical energy and at a trigger intensity of the crystal, an electrical conductivity. Diminish the electric field by the electrical conductivity along the illuminated path to define a collapsed electric field; and create in a second light wave of the stored optical energy, using the electro-optic property of the crystal as applied to the collapsed electric field, an orthogonal polarization state.

The cavity-dumping laser system further includes an optical release mechanism positioned within the beam path of the resonator and configured to pass, based on a beam splitting property of the optical release mechanism applied to the initial polarization state, the first light wave into the beam path along the substantially-longitudinal axis of the resonator; and refract, based on the beam splitting property of the optical release mechanism applied to the orthogonal polarization state, an extracted portion of the stored optical energy including the second light wave out of the beam path at an angle to the substantially-longitudinal axis of the resonator, to define a dumped laser pulse.

The cavity-dumping laser system may have one or more mirrors (a plurality) that are completely reflective. The cavity-dumping laser system crystal of the optical element may comprise a sillenite-family crystal. The cavity-dumping laser system sillenite-family crystal may be of the optical element comprises a Bismuth Silicon Oxide (BSO) material, and the electric field may be characterized by an applied voltage.

An applied voltage V1/2 may be defined as:

$$V_{1/2} = \frac{\lambda D}{2 L n_o^3 r_{41}}$$

Where $\lambda$, denotes a wavelength of the first light wave, D denotes a thickness of the crystal, L denotes an optical path length of the illuminated path, $n_o$ is a refractive index of the crystal and $r_{41}$ is a linear electro-optic coefficient of the crystal.

The cavity-dumping laser system may include an optical release mechanism of a polarization-sensitive optical component type selected from the group consisting of a polarizer, an intracavity polarizer, a diffraction grating, a cycloidal wave plate, a photorefractive grating, a thermal grating, a holographic diffraction element, and a chiral liquid crystal mirror. The trigger intensity of the crystal approximately equals a saturation fluence of the laser gain medium. The plurality of mirrors may further comprise a pair of completely reflective flat mirrors and a pair of telescopes positioned between the pair of completely reflective flat mirrors along the substantially-longitudinal axis of the resonator and proximate an input to the crystal from the beam path and an output to the beam path from the crystal, respectively, and configured to create the illuminated path of greater diameter than the beam path to partially define the trigger intensity of the crystal. The plurality of mirrors may further comprise a pair of completely reflective concave mirrors, where the optical element is positioned between the pair of completely reflective concave mirrors and at a focal length along the substantially-longitudinal axis of the resonator such that a diameter of the illuminated path at the focal length partially defines the trigger intensity of the crystal.

The cavity-dumping laser system wherein the absorbed portion of the stored optical energy comprises a harmonic light wave of one of a second harmonic type and a third harmonic type.

The cavity-dumping laser system may further comprise a nonlinear optic positioned within the beam path of the resonator and configured to create the harmonic light wave.

The present invention may further include a method of operating a cavity dumped laser. The method may include a plurality of mirrors defining a resonator characterized by a beam path. A laser gain medium positioned along a substantially-longitudinal axis of the resonator. An optical element positioned within the beam path of the resonator and comprising a crystal; and an optical release mechanism positioned within the beam path of the resonator. The method may further include, receiving and using the laser gain medium and the optical energy from at least one of an excitation source and the plurality of mirrors to form from the optical energy, using the laser gain medium, a stored optical energy positioned within the beam path and characterized by a variable optical intensity. The method further including receiving, using the crystal, an electric field in an illuminated portion of the crystal proximate the beam path, defined as an illuminated path and creating in a first light wave of the stored optical energy. Using an electro-optic property of the crystal as applied to the electric field, an initial polarization state. Creating and using a photoconductive property of the crystal as applied to an absorbed portion of the stored optical energy and at a trigger intensity of the crystal, an electrical conductivity. Diminishing, using the crystal, the electric field by the electrical conductivity along the illuminated path to define a collapsed electric field. Creating in a second light wave of the stored optical energy, using the electro-optic property of the crystal as applied to the collapsed electric field, an orthogonal polarization state. Passing, using a beam splitting property of the optical release mechanism applied to the initial polarization state, the first light wave into the beam path along the substantially-longitudinal axis of the resonator; and refracting, using the beam splitting property of the optical release mechanism applied to the orthogonal polarization state, an extracted portion of the stored optical energy including the second light wave out of the beam path at an angle to the substantially-longitudinal axis of the resonator, to define a dumped laser pulse.

The method may further include at least one of the plurality of mirrors is completely reflective. The crystal of the optical element comprises a sillenite-family crystal.

The sillenite-family crystal of the optical element may comprise a Bismuth Silicon Oxide (BSO) material. The electric field comprises an applied voltage $V_{1/2}$ may be defined as:

$$V_{1/2} = \frac{\lambda D}{2Ln_o^3 r_{41}}$$

Where $\lambda$, denotes a wavelength of the first light wave, D denotes a thickness of the crystal, L denotes an optical path length of the illuminated path, $n_o$ is a refractive index of the crystal and $r_{41}$ is a linear electro-optic coefficient of the crystal.

The optical release mechanism is of a polarization-sensitive optical component type selected from the group consisting of a polarizer, an intracavity polarizer, a diffraction grating, a cycloidal wave plate, a photorefractive grating, a thermal grating, a holographic diffraction element, and a chiral liquid crystal mirror. The trigger intensity of the crystal approximately equals a saturation fluence of the laser gain medium. The plurality of mirrors may further comprise a pair of completely reflective flat mirrors where the cavity dumped laser further comprises a pair of telescopes positioned between the pair of completely reflective flat mirrors along the substantially-longitudinal axis of the resonator and proximate an input to the crystal from the beam path and an output to the beam path from the crystal, respectively. The method may further comprise creating, using the pair of telescopes, the illuminated path of greater diameter than the beam path to partially define the trigger intensity of the crystal.

The plurality of mirrors may further comprise a pair of completely reflective concave mirrors; and where the optical element is positioned between the pair of completely reflective concave mirrors and at a focal length along the substantially-longitudinal axis of the resonator such that a diameter of the illuminated path at the focal length partially defines the trigger intensity of the crystal. The absorbed portion of the stored optical energy may comprise a harmonic light wave of one of a second harmonic type and a third harmonic type. In one embodiment by creating, using a nonlinear optic, the harmonic light wave.

The present invention may also include an optical switch for use with a cavity-dumping laser. The laser including a plurality of mirrors defining a resonator characterized by a beam path, a a laser gain medium positioned along a substantially-longitudinal axis of the resonator and configured to amplify optical energy received from at least one of an excitation source and the plurality of mirrors to form within the beam path a stored optical energy characterized by a variable optical intensity; and an optical release mechanism positioned within the beam path of the resonator. The optical release mechanism may be configured to pass, based on a beam splitting property of the optical release mechanism applied to an initial polarization state, a first light wave into the beam path along the substantially-longitudinal axis of the resonator; and refract, based on the beam splitting property of the optical release mechanism applied to an orthogonal polarization state. An extracted portion of the stored optical energy including a second light wave out of the beam path at an angle to the substantially-longitudinal axis of the resonator, to define a dumped laser pulse. The optical switch positioned within the beam path of the resonator, and comprising a crystal configured to receive an electric field in an illuminated portion of the crystal proximate the beam path, defined as an illuminated path, create in the first light wave of the stored optical energy, based on an electro-optic property of the crystal as applied to the electric field, the initial polarization state. The optical release mechanism may further create, based on a photoconductive property of the crystal as applied to an absorbed portion of the stored optical energy and at a trigger intensity of the crystal, an electrical conductivity, diminish the electric field by the electrical conductivity along the illuminated path to define a collapsed electric field; and create in the second light wave of the stored optical energy, based on the electro-optic property of the crystal as applied to the collapsed electric field, the orthogonal polarization state. The crystal may comprise a sillenite-family crystal. The sillenite-family crystal comprises a Bismuth Silicon Oxide (BSO) material, and the electric field is characterized by an applied voltage $V_{1/2}$ as defined above, where the absorbed portion of the stored optical energy comprises a harmonic light wave of a third harmonic type.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed

DETAILED DESCRIPTION

Specific embodiments of the disclosure will now be described in detail with reference to the accompanying figures. While this disclosed design is susceptible of being embodied in many different forms, there is shown in the drawings and will herein be described in detail specific embodiments, with the understanding that the present disclosure is to be considered as an example of the principles of the disclosed design and not intended to limit the disclosed design to the specific embodiments shown and described. In the description below, like reference numerals may be used to describe the same, similar or corresponding parts in the several views of the drawings.

The present disclosure relates generally to systems and associated methods for automatically generating high power pulses from a laser system in which the spontaneous emission lifetime is normally too short to allow any significant energy to be stored in the laser host.

Variable attenuators typically used for Q-switching and mode locking implementations are rarely mechanical in nature (although early Q-switches included spinning mirror or prisms). More commonly, active Q-switching designs employ some form of externally-controlled electro-optic shutter, such as an acousto-optic shutter or a Pockels cell. Acousto-optic shutters work by employing an acoustic wave, driven by a transducer, to create strong diffraction in a suitable transparent medium which is used to affect the internal transmission properties of the laser resonator. Pockels cell devices use a strong electric field to change the transmission of polarized light through a pair of crossed polarizers. Alternatively, Q-switching designs known in the art typically employ an indirectly controlled attenuator such as a saturable absorber. Saturable absorbers initially absorb any emitted fluorescence from the laser material until a given intensity is reached, at which point the saturable absorber "saturates" and becomes suddenly transparent.

Whether the pulses generated by the pulsed laser produce single high-power pulses (Q-switching) or a continuous train of very short pulses at lower energy (but still very high peak power) depends mainly on the available shutter speed. If the shutter duration is longer than the roundtrip time of light within the resonator, a large Q-switched pulse is usually generated. Conversely, if the shutter speed is made very fast so that the switching time is less than the roundtrip time in the resonator (as is possible with Pockels cells and also with most saturable absorbers), mode locked pulses are generally produced.

Figure 1A:
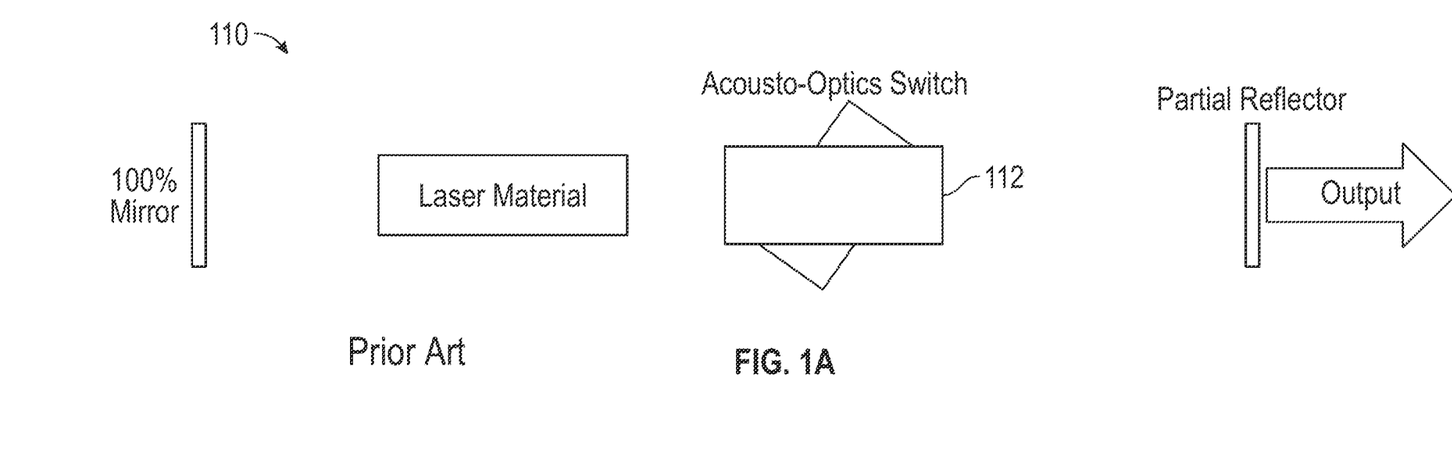
FIG. 1A is a pulse laser embodiment.
Figure 1B:
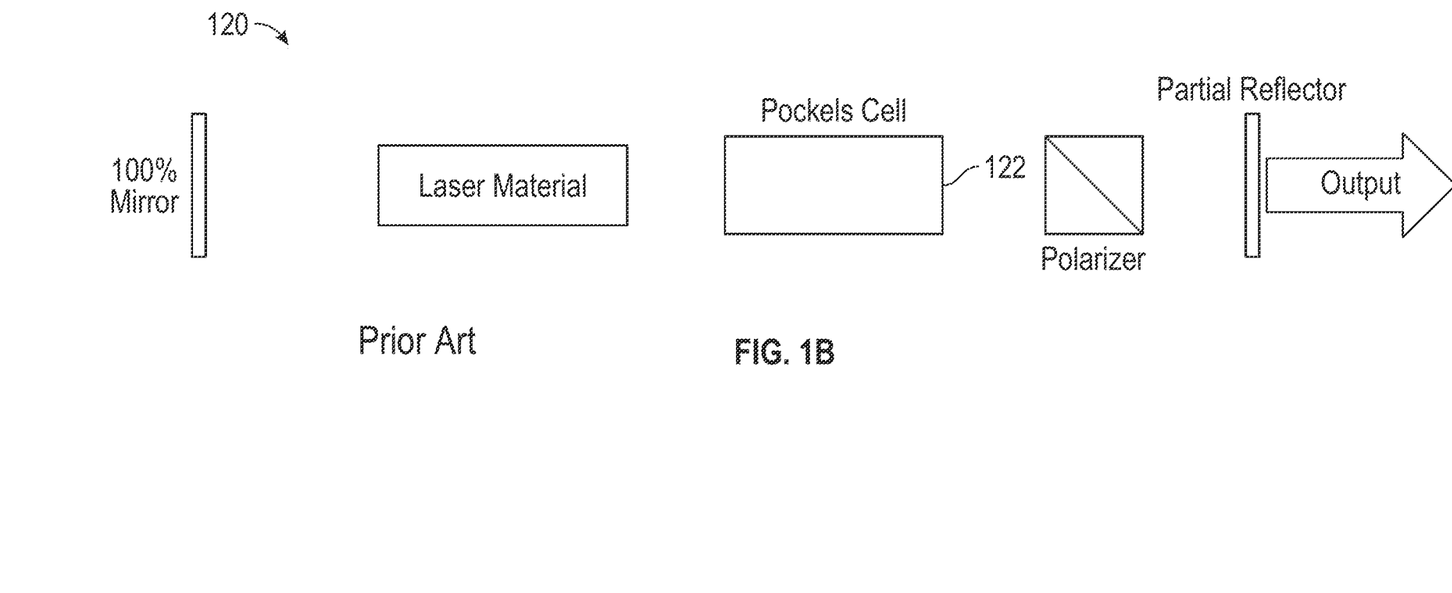
FIG. 1B is a pulse laser embodiment.
Figure 1C:
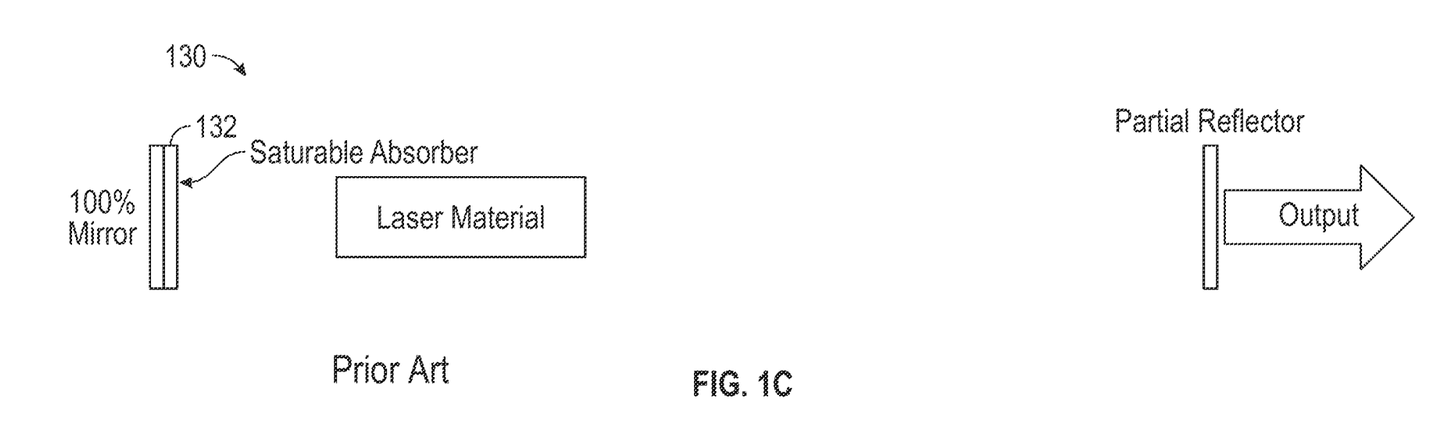
FIG. 1C is a pulse laser embodiment.

FIGS. 1A, 1B, and 1C illustrate exemplary pulsed laser designs 110, 120, 130 employing attenuators in the form of an acousto-optic switch 112, a Pockels cell 122, and a saturable absorber 132, respectively.

With the exception of saturable absorbers, most Q-switched and mode locked lasers require high speed sophisticated electronic control. As described above, saturable absorbers are unique in that they do not require any external control and operation is determined solely by light intensity within the laser resonator. This operation has many economic and space-saving advantages, saturable absorbers are commonly used in practice to achieve pulsed operation in laser systems. However, pulsed operation (and Q-switching in particular) is difficult to achieve in certain design instances, regardless of the Q-switch method, primarily because the spontaneous emission lifetime of some laser materials is very short. More specifically, a short lifetime may result in insufficient time to store energy in the laser host before that energy radiates away through spontaneous emission.

Attempts to force energy into the laser material more rapidly to compensate for the short spontaneous emission lifetime usually result in catastrophic damage to the laser material. This phenomenon is particularly problematic for semiconductor lasers, dye lasers and most transition metal lasers. To design around inherent limitations of certain laser materials, a method of cavity dumping may be used where optical energy is stored within the laser resonator instead of in the laser material.

Figure 1D:
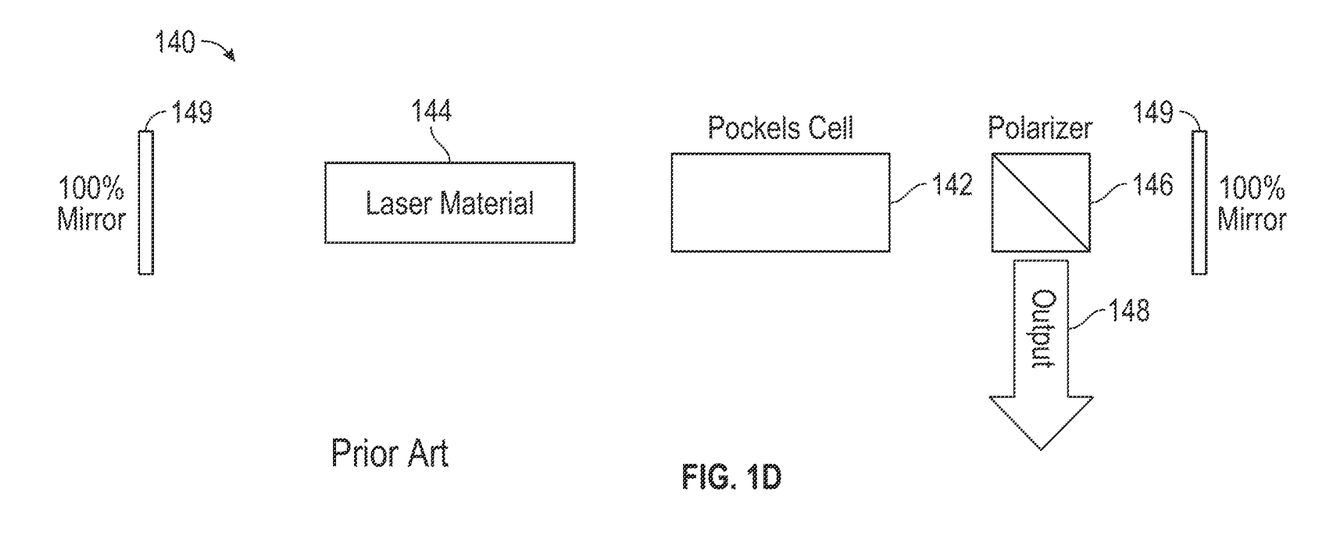
FIG. 1D is a pulse laser embodiment.

FIG. 1D illustrates an exemplary pulsed laser design 140 featuring a cavity dumped laser arrangement. Cavity dumping commonly uses a Pockels cell 142 as the optical switch. Cavity dumping is similar to the Q-switched laser design 120 shown in FIG. 1B (e.g., employing a laser material 144 and a polarizer 146 along with the optical switch 142), except that laser output 148 does not come through a partially transparent mirror (sometimes referred to as the "output coupler"). Instead, both ends of the laser resonator are made to be reflective to trap light between these two mirrors 149. If the optical losses in the resonator are small, laser action may continuously add power to a light beam as it bounces back and forth between the mirrors 149. The optical power trapped within the laser resonator can become very high.

Once sufficient power has been generated, the optical switch 142 may operate the polarizer 146 to divert virtually all of the stored power out of the side of the resonator as a single pulse of energy 148. In essence, this output optical power 148 is "dumped" out of the laser resonator (sometimes call a "laser cavity") all at once.

The pulse characteristics from a cavity dumped laser differ somewhat from a Q-switched laser. For example, the peak power from a Q-switched laser depends on the generated pulse duration. However, cavity dumped pulses are characterized by the same peak power, regardless of the pulse duration. The cavity dumped laser pulse energy scales linearly with the pulse duration and the pulse duration is determined by the resonator length. For example, a 10 centimeter (cm) long cavity dumped laser produces the same peak power as a 100 cm long laser resonator, but the energy is 10 times larger for the 100 cm resonator compared with the 10 cm resonator. The reason for this difference is that the peak power of the generated pulse is defined as the power level that is trapped within the resonator.

Because a longer resonator takes longer to "drain," the output power in the pulse is maintained for a longer duration. Power is defined as the energy delivered in a given amount of time and so, conversely, the energy is given by the power multiplied by the pulse time. Because the power is always constant, therefore the energy depends on the pulse duration and, hence, on the resonator length.

Cavity dumping designs may employ an optical switch with a rise time (time to open) that is much faster than the optical roundtrip time. The primary issue with this technique lies with this switch speed limitation. For example, Pockels cells typically have rise times of a few nanoseconds. Because light travels approximately one foot per nanosecond, the laser resonator must be made quite long. Consequently, the achievable optical pulse duration is almost invariably longer than 5-10 nanoseconds. Furthermore, the electronics required to drive such a Pockels cell are typically very sophisticated with carefully matched impedances to prevent "ringing" of the Pockels cell.

Embodiments of the pulsed laser design described herein may achieve cavity dumping by incorporating an optical element that has the properties of being both an electro-optic material and a photoconductor. Such a material may be, for example, and without limitation, a member of the selenite-family of crystals such as Bismuth Silicon Oxide (BSO) or Bismuth Germanium Oxide (BGO). This optical element is substituted for the Pockels cell 142 shown in FIG. 1D.

The pulsed laser design reduces the need for electronic control of the laser system. Furthermore, pulses may be generated at a rate that is proportional to the laser operating power of the present design. Additionally, embodiments of the present design also may advantageously be used to automatically optimize the output coupling for a laser by automatically maintaining a fixed resonator power density irrespective of the actual output power from the laser.

The intracavity pulsed laser technology design described herein may be capable of automatically operating a laser at the peak of efficiency for any arbitrary pump power. The same technology may advantageously generate high peak power pulses automatically even when the available laser material has no ability to store energy. This attribute is particularly appropriate for low size, weight, and power (SWaP) semiconductor lasers that have no inherent ability to generate energetic pulses.

Although embodiments of the present pulsed laser design may be aimed at short spontaneous emission lifetime lasers (e.g., semiconductors), embodiments of the same design may be widely applicable to most laser types. Advantageous applications of the present pulsed laser design include laser machining, where the high peak power pulses help to eject debris from the cutting area, producing a cleaner cut. Medical applications of the present pulsed laser design include laser eye surgery and skin surgery.

Figure 2:
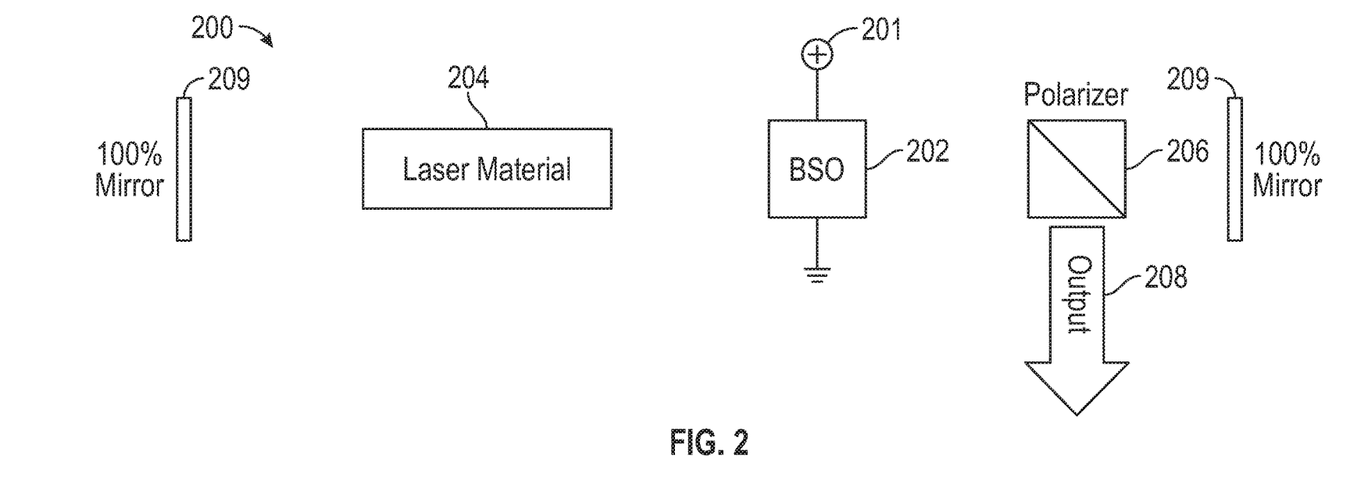
FIG. 2 is a schematic diagram of a cavity-dumping laser system, in accordance with embodiments of the disclosure.

FIG. 2 shows a cavity-dumping laser system 200 according to an embodiment. For example, and without limitation, a pair of mirrors 209 may define between them a resonator along which an optical beam may traverse. Depending on the desired shape of the optical beam, the mirrors 209 may be, for example, and without limitation, flat or curved or some combination thereof. In the illustrated embodiment 200, the mirrors 209 may be 100% reflective and flat. A laser gain medium 204 may be positioned along a substantially-longitudinal axis of the resonator and may operate to amplify optical energy received from an excitation source (not shown) by adding to that input energy the optical beam traversing between the mirrors 209. The stored optical energy resulting from this amplification process may exhibit a variable optical intensity that builds within the resonator until it is released as output energy 208.

Also positioned along the beam path of the resonator may be an optical element in the form of a crystal 202. For example, and without limitation, the crystal 202 may be characterized by both electro-optic and photoconductive properties, as is the case with certain selenite-family crystals such as Bismuth Silicon Oxide (BSO) and a Bismuth Germanium Oxide (BGO). The crystal 202 may operate to receive an electric field 201 into an illuminated portion of the crystal 202 along the beam path and to alter a linear polarization of incident light based on the electro-optic properties of the crystal 202 as applied to the electric field 201. The crystal 202 also may operate to create an electrical conductivity along the illuminated portion of the crystal 202 based on the photoconductive property of the crystal 202, which may diminish (e.g., collapse) the electric field 201 and, in turn, the ability of the crystal 202 to alter the linear polarization of incident light as described above. Consequently, the electro-optic nature of the crystal 202 as influenced by the electric field 201 may consistently alter the linear polarization of incident light except in the event(s) that the incident light reaches a trigger intensity such that the photoconductive nature of the crystal 202 collapses the electric field 201 upon which such alteration of the linear polarization depends.

Also positioned along the beam path of the resonator may be an optical release mechanism 206 having a beam splitting property that may operate to allow incident light having an initial polarization state to pass through the optical release mechanism 206, and to alter a propagation direction (e.g., refract, reflect, diffract) of incident light having an orthogonal polarization state. For example, and without limitation, the optical release mechanism 206 may be one of a polarizer, an intracavity polarizer, a diffraction grating, a cycloidal wave plate, a photorefractive grating, a thermal grating, a holographic diffraction element, or a chiral liquid crystal mirror.

Applying the optical release mechanism 206 in cooperation with the other design components described above, the electro-optic nature of the crystal 202 as influenced by the electric field 201 may alter the linear polarization (i.e., initial polarization state) of incident light such that the resultant light passes through the optical release mechanism 206 and, consequently, adds to the building optical energy in the resonator.

Further applying the optical release mechanism 206, when the incident light reaches a trigger intensity such that the photoconductive nature of the crystal 202 collapses the electric field 201, the unaltered linear polarization (i.e., orthogonal polarization state) of the incident light may result in the optical release mechanism 206 refracting the optical energy stored in the resonator. This refraction action may produce the output energy 208, thus creating a dumped laser pulse.

FIG. 2 also shows that BSO and other appropriate crystalline materials characterized as electro-optic may affect a polarization state of light traveling through the crystal 202 when an external electric field 201 is applied. BSO is "optically active" in that such a crystal may naturally rotate the plane of linearly-polarized light at a rate of approximately 42 degrees per millimeters (mm) at 500 nanometers (nm) and at a rate of 25 degrees per mm at 600 nm. Therefore, the presence of such natural optical activity may be taken into account in the design of embodiments of the cavity-dumping system 200.

For example, and without limitation, the physical length of the crystal 202 may be chosen to result in an odd multiple of 90 degrees at the design wavelength. Doing so may facilitate the light waves transmitted by the crystal 202 are completely rejected by an optical release mechanism 206, such as an intra-cavity polarizer. For example, and without limitation, a BSO operated at 600 nm may have a physical length of 3.6 mm, or 10.8 mm, or 18.0 mm, etc. After account has been taken of any natural optical activity of the chosen crystal 202, an applied voltage to create the electric field 201 necessary to induce an additional 90 degree linear polarization rotation may be given by the following formula:

$$V_{1/2} = \frac{\lambda D}{2L n_o^3 r_{41}}$$

where λ is the wavelength of an incident light, D is the thickness of the crystal 202 between electrodes, L is the optical path length through the crystal 202, $n_o$ is the refractive index of the crystal 202, and $r_{41}$ is the linear electro-optic coefficient of the crystal 202.

For a BSO crystal 10.8 mm in length and 5 mm in thickness, the necessary applied voltage along the 5 mm direction is 1695 Volts at 600 nm. Under these conditions, linearly polarized light entering the crystal 202 may exit 180 degrees rotated from its original orientation (90 degrees from optical activity plus 90 degrees from the applied electric field 201). From a polarization perspective, when the electric field 201 is applied to the BSO crystal 202, the light may appear unchanged and may pass through an intra-cavity polarizer 206 as if the BSO crystal 202 was absent. However, when the electric field 201 is removed, substantially all of the light passing through the BSO crystal 202 is rejected by the intra-cavity polarizer 206.

BSO and other appropriate crystalline materials characterized as photoconductive may partially absorb incident light. In doing so, such a crystal employed as the optical element 202 in the present design may introduce a level of conductivity that may reduce (i.e., collapse) the electric field 201 wherever light is absorbed. This interplay between the electro-optic and photoconductive properties of the employed crystal 202 may provide the physical basis for creating a cavity-dumping device 200. For example, and without limitation, optical energy may build up within the resonator until such time as the presence of that light may cause the electric field 201 to collapse in the illuminated path through the BSO 202.

The collapse in the electric field 201 may turn off the electro-optic 90 degree polarization rotation in the received light waves and may leave behind just the optical activity 90 degree polarization state. The resultant light emerging from the BSO crystal 202 may then be rejected immediately by the intra-cavity polarizer 206, thereby "dumping" the light out of the resonator path. Once this dumping of stored energy has occurred and the stored light has been removed from the resonator, laser action may begin once again to store increasing light power in the resonator until the BSO 202 is triggered once again, thereby producing a repeated cycle of laser pulses. The rate of triggering may depend on how quickly light builds up in the resonator, so the laser pulse repetition rate may scale linearly with the average laser power.

Embodiments as described herein may not function as a cavity dumped laser when the laser operating wavelength coincides with the absorption spectrum of BSO (or other material acting as the optical element 202). For example, and without limitation, because of photoconductive nature of a BSO crystal 202, the electrical conductivity of the illuminated portion of the BSO crystal 202 may continuously increase as the circulating optical power in the resonator builds up. In this situation, the amount of light leaking away through the polarizer 206 may continuously rise until the intra-cavity optical power density reaches some steady state value. The effect is to "clamp" the intra-cavity laser power density at some fixed value and to always reject the excess light (that is, the output energy 208) at the polarizer 206.

This phenomenon may help to maximize the laser system efficiency. More specifically, the optimum mirror reflectivity for a laser may be determined by the need to maintain an optical intensity in the laser medium which corresponds (e.g., is equal) to the "saturation intensity" (also referred to as "saturation fluence"). The saturation intensity is the intensity of light that is needed to efficiently deplete any stored energy in the laser medium. The optimum output coupler mirror reflectivity, therefore, may depend on how aggressively the laser medium is being driven by the excitation source.

If the medium is being driven gently, a high reflectivity mirror may be needed in order to send back sufficient light to extract the stored energy on each roundtrip path through the resonator. Conversely, if the laser medium is being driven aggressively, a lower reflectivity mirror may be needed as the optical gain may be much higher. Therefore, less feedback light may be needed to extract the stored energy. In other words, the mirror reflectivity may be adjusted according to the magnitude of the optical gain within the laser material which acts like an optical amplifier within the resonator. The optical gain may depend on how aggressively the laser material is being driven into laser action.

To take advantage of the above-described phenomenon, the BSO crystal 202 may be used to "clamp" the intra-cavity intensity at the saturation density for the laser material of the laser gain medium 204. In this case, the laser may operate at the ideal output coupling and the BSO/polarizer combination 202, 206 may act as a continuously variable reflectivity mirror to generate the output energy 208, while the internal optical intensity may be kept constant regardless of how far the system 200 (i.e., laser) is operated above threshold. The "clamped" intensity within the resonator may be controlled and/or adjusted by choosing an appropriate beam diameter through the BSO crystal 202.

Figure 3:
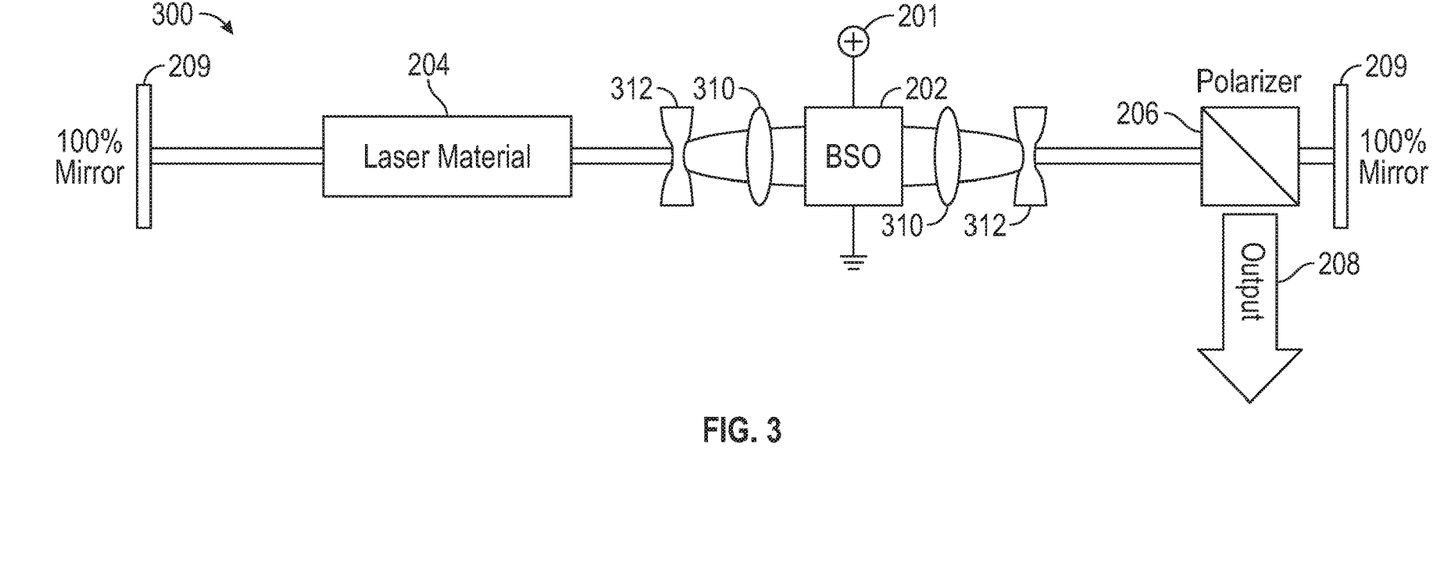
FIG. 3 is a schematic diagram of a cavity-dumping laser system, in accordance with embodiments of the disclosure.
Figure 4:
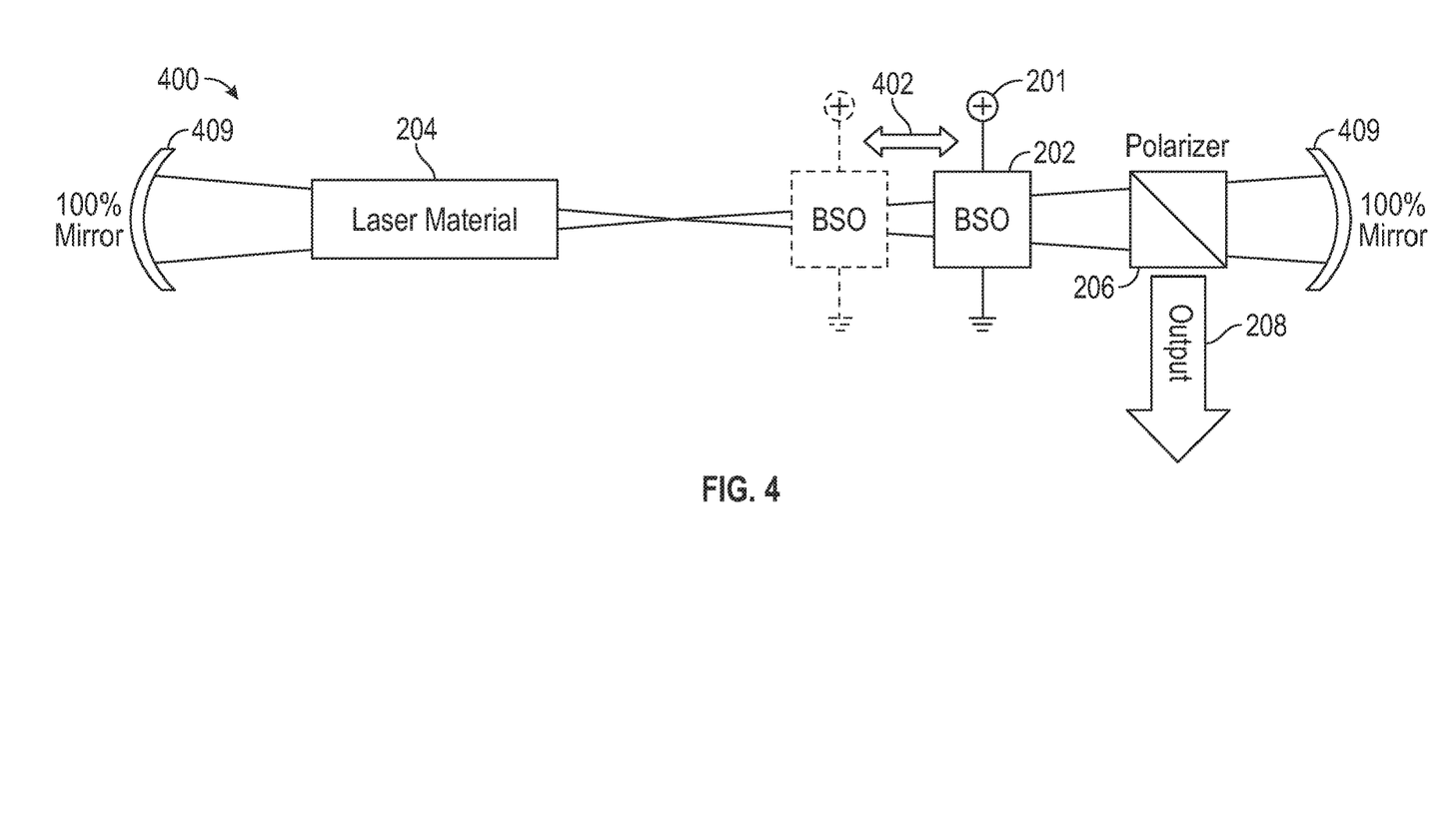
FIG. 4 is a schematic diagram of a cavity-dumping laser system, in accordance with embodiments of the disclosure.

As illustrated in FIG. 3, for example, and without limitation, such beam diameter manipulation may be achieved by placing the BSO 202 within beam diameter controlling telescopes 310, 312. Also for example, and without limitation, FIG. 4 illustrates how such beam diameter manipulation may be achieved by inverting the beam using concave mirrors 409 to define the resonator and adjusting 402 the BSO crystal 202 position within the resonator along a focal length of the beam path to intercept the beam at a desired beam diameter.

Although the phenomenon described above nominally may prevent the creation of a cavity dumped laser, one embodiment of the present design may incorporate some optical nonlinearity into the optical switching.

An optical nonlinearity is a change to the optical properties of a material in response to the optical intensity. Linear optical components, such as prisms, mirrors, and lenses, may behave in the same way regardless of the intensity of the light source used with these components. Nonlinear optical components, on the other hand, may behave like linear optics at relatively low intensities, but may dramatically change when a threshold intensity is reached. Of particular interest in embodiments of the present design is the presence of a sharp threshold in order to activate the nonlinearity. For example, and without limitation, harmonic conversion occurs where two or three fundamental photons are combined in a nonlinear medium to create photons at twice or three times the original photon frequencies, respectively.

Certain embodiments of the present design may include causing a BSO crystal 202 to act as a cavity dumping switch by operating the laser at a wavelength that is not absorbed by the BSO 202. Then, nonlinear optics within the resonator may generate second or third harmonic photons once the fundamental laser intensity reaches the threshold for nonlinear conversion. For example, and without limitation, the harmonic photons may come from a separate harmonic converter crystal in the laser resonator (such as LiNbO3 or BBO), or these harmonic photons may be generated directly by the BSO itself. BSO has a cubic structure and, therefore, will not generate a second harmonic. But all materials, including BSO, can generate third harmonic light.

In certain embodiments, the harmonic light may trigger the BSO 202 and not the fundamental light. BSO absorbs strongly in the Ultra Violet (UV), weakly in the visible spectrum, and is mostly transparent in the Infra Red (IR), especially at a wavelength beyond 1 micron. Lasers such as Nd:YAG, operating at 1.06 microns, or Cr:ZnSe, operating at 2.4 microns, may be candidates for this technique. Using the BSO to directly generate the nonlinear photons, the BSO crystal 202 may be triggered by 355 nm photons (Nd:YAG laser third harmonic) or 800 nm photons (Cr:ZnSe third harmonic). Alternatively, a 1.06 micron Nd:YAG laser may be triggered by the second harmonic at 532 nm from a frequency doubling crystal placed in a laser resonator.

Also, BSO (or other materials) may be doped with elements known to alter the transmission and photoconductivity properties, such as Cr and Fe ion doping. For applications which may require larger energy, but without any increase in the peak power, a fiber optic version may be employed as the resonator may be made to an arbitrary length without encountering diffraction losses.

It will be appreciated that the devices, systems and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

What is claimed is:

1. A cavity-dumping laser system comprising:
   a plurality of mirrors defining a resonator characterized by a beam path;
   a laser gain medium positioned along a substantially-longitudinal axis of the resonator and configured to amplify optical energy received from at least one of an excitation source and the plurality of mirrors to form within the beam path a stored optical energy having a variable optical intensity;
   an optical element positioned within the beam path of the resonator, and comprising a crystal configured to:
      receive an electric field in an illuminated portion of the crystal proximate the beam path, defined as an illuminated path;
      create in a first light wave of the stored optical energy, using an electro-optic property of the crystal as applied to the electric field, an initial polarization state;
      create, based on a photoconductive property of the crystal as applied to an absorbed portion of the stored optical energy and at a trigger intensity of the crystal, an electrical conductivity;
      diminish the electric field by the electrical conductivity along the illuminated path to define a collapsed electric field; and
      create in a second light wave of the stored optical energy, using the electro-optic property of the crystal as applied to the collapsed electric field, an orthogonal polarization state;
   an optical release mechanism positioned within the beam path of the resonator and configured to:
      pass, based on a beam splitting property of the optical release mechanism applied to the initial polarization state, the first light wave into the beam path along the substantially-longitudinal axis of the resonator; and
      refract, based on the beam splitting property of the optical release mechanism applied to the orthogonal polarization state, an extracted portion of the stored optical energy including the second light wave out of the beam path at an angle to the substantially-longitudinal axis of the resonator, to define a dumped laser pulse.

2. The cavity-dumping laser system according to claim 1, where the crystal of the optical element comprises a sillenite-family crystal.

3. The cavity-dumping laser system according to claim 2, where the sillenite-family crystal of the optical element comprises a Bismuth Silicon Oxide (BSO) material, and the electric field is characterized by an applied voltage $V_{1/2}$ defined as:

$$V_{1/2} = \frac{\lambda D}{2Ln_o^3 r_{41}};$$

where $\lambda$ denotes a wavelength of the first light wave;
where D denotes a thickness of the crystal;
where L denotes an optical path length of the illuminated path;
where $n_o$ is a refractive index of the crystal; and
where $r_{41}$ is a linear electro-optic coefficient of the crystal.

4. The cavity-dumping laser system according to claim 1, where the optical release mechanism is of a polarization-sensitive optical component type selected from the group consisting of a polarizer, a diffraction grating, a cycloidal wave plate, a photorefractive grating, a thermal grating, a holographic diffraction element, and a chiral liquid crystal mirror.

5. The cavity-dumping laser system according to claim 1, where the trigger intensity of the crystal approximately equals a saturation fluence of the laser gain medium.

6. The cavity-dumping laser system according to claim 5, where the plurality of mirrors further comprises a pair of completely reflective flat mirrors; and further comprising a pair of telescopes positioned between the pair of completely reflective flat mirrors along the substantially-longitudinal axis of the resonator and proximate an input to the crystal from the beam path and an output to the beam path from the crystal, respectively, and configured to create the illuminated path of greater diameter than the beam path to partially define the trigger intensity of the crystal.

7. The cavity-dumping laser system according to claim 5, where the plurality of mirrors further comprises a pair of completely reflective concave mirrors; and where the optical element is positioned between the pair of completely reflective concave mirrors and at a focal length along the substantially-longitudinal axis of the resonator such that a diameter of the illuminated path at the focal length partially defines the trigger intensity of the crystal.

8. The cavity-dumping laser system according to claim 1, where the absorbed portion of the stored optical energy comprises a harmonic light wave of one of a second harmonic type and a third harmonic type.

9. The cavity-dumping laser system according to claim 8, further comprising a nonlinear optic positioned within the beam path of the resonator and configured to create the harmonic light wave.

10. A method of operating a cavity dumped laser including:
  a plurality of mirrors defining a resonator characterized by a beam path;
  a laser gain medium positioned along a substantially-longitudinal axis of the resonator;
  an optical element positioned within the beam path of the resonator and comprising a crystal; and
  an optical release mechanism positioned within the beam path of the resonator; the method comprising:
  receiving, using the laser gain medium, optical energy from at least one of an excitation source and the plurality of mirrors;
  forming from the optical energy, using the laser gain medium, a stored optical energy positioned within the beam path and characterized by a variable optical intensity;
  receiving, using the crystal, an electric field in an illuminated portion of the crystal proximate the beam path, defined as an illuminated path;
  creating in a first light wave of the stored optical energy, using an electro-optic property of the crystal as applied to the electric field, an initial polarization state;
  creating, using a photoconductive property of the crystal as applied to an absorbed portion of the stored optical energy and at a trigger intensity of the crystal, an electrical conductivity;
  diminishing, using the crystal, the electric field by the electrical conductivity along the illuminated path to define a collapsed electric field;
  creating in a second light wave of the stored optical energy, using the electro-optic property of the crystal as applied to the collapsed electric field, an orthogonal polarization state;
  passing, using a beam splitting property of the optical release mechanism applied to the initial polarization state, the first light wave into the beam path along the substantially-longitudinal axis of the resonator; and
  refracting, using the beam splitting property of the optical release mechanism applied to the orthogonal polarization state, an extracted portion of the stored optical energy including the second light wave out of the beam path at an angle to the substantially-longitudinal axis of the resonator, to define a dumped laser pulse.

11. The method according to claim 10, where the crystal of the optical element comprises a sillenite-family crystal.

12. The method according to claim 11, where the sillenite-family crystal of the optical element comprises a Bismuth Silicon Oxide (BSO) material; and the electric field comprises an applied voltage $V_{1/2}$ defined as:

$$V_{1/2} = \frac{\lambda D}{2L n_o^3 r_{41}}$$

where $\lambda$ denotes a wavelength of the first light wave;
where D denotes a thickness of the crystal;
where L denotes an optical path length of the illuminated path;
where $n_o$ is a refractive index of the crystal; and
where $r_{41}$ is a linear electro-optic coefficient of the crystal.

13. The method according to claim 10, where the optical release mechanism is of a polarization-sensitive optical component type selected from the group consisting of a polarizer, a diffraction grating, a cycloidal wave plate, a photorefractive grating, a thermal grating, a holographic diffraction element, and a chiral liquid crystal mirror.

14. The method according to claim 10, where the trigger intensity of the crystal approximately equals a saturation fluence of the laser gain medium.

15. The method according to claim 14, where the plurality of mirrors further comprises a pair of completely reflective flat mirrors; and where the cavity dumped laser further comprises a pair of telescopes positioned between the pair of completely reflective flat mirrors along the substantially-longitudinal axis of the resonator and proximate an input to the crystal from the beam path and an output to the beam path from the crystal, respectively; the method further comprising creating, using the pair of telescopes, the illuminated path of greater diameter than the beam path to partially define the trigger intensity of the crystal.

16. The method according to claim 14, where the plurality of mirrors further comprises a pair of completely reflective concave mirrors; and where the optical element is positioned between the pair of completely reflective concave mirrors and at a focal length along the substantially-longitudinal axis of the resonator such that a diameter of the illuminated path at the focal length partially defines the trigger intensity of the crystal.

17. The method according to claim 10, where the absorbed portion of the stored optical energy comprises a harmonic light wave of one of a second harmonic type and a third harmonic type.

18. The method according to claim 17, further comprising creating, using a nonlinear optic, the harmonic light wave.

19. An optical switch for use with a cavity-dumping laser comprising:
  a plurality of mirrors defining a resonator characterized by a beam path;
  a laser gain medium positioned along a substantially-longitudinal axis of the resonator and configured to amplify optical energy received from at least one of an excitation source and the plurality of mirrors to form within the beam path a stored optical energy characterized by a variable optical intensity; and
  an optical release mechanism positioned within the beam path of the resonator, and configured to:
    pass, based on a beam splitting property of the optical release mechanism applied to an initial polarization state, a first light wave into the beam path along the substantially-longitudinal axis of the resonator; and
    refract, based on the beam splitting property of the optical release mechanism applied to an orthogonal polarization state, an extracted portion of the stored optical energy including a second light wave out of the beam path at an angle to the substantially-longitudinal axis of the resonator, to define a dumped laser pulse;
  the optical switch positioned within the beam path of the resonator, and comprising a crystal configured to:

receive an electric field in an illuminated portion of the crystal proximate the beam path, defined as an illuminated path;

create in the first light wave of the stored optical energy, based on an electro-optic property of the crystal as applied to the electric field, the initial polarization state;

create, based on a photoconductive property of the crystal as applied to an absorbed portion of the stored optical energy and at a trigger intensity of the crystal, an electrical conductivity;

diminish the electric field by the electrical conductivity along the illuminated path to define a collapsed electric field; and create in the second light wave of the stored optical energy, based on the electro-optic property of the crystal as applied to the collapsed electric field, the orthogonal polarization state.

20. The optical switch according to claim 19, where the crystal comprises a sillenite-family crystal.

21. The optical switch according to claim 20, where the sillenite-family crystal comprises a Bismuth Silicon Oxide (BSO) material, and the electric field is characterized by an applied voltage $V_{1/2}$ defined as:

$$V_{1/2} = \frac{\lambda D}{2L n_o^3 r_{41}}$$

where $\lambda$ denotes a wavelength of the first light wave;
where D denotes a thickness of the crystal;
where L denotes an optical path length of the illuminated path;
where $n_o$ is a refractive index of the crystal; and
where $r_{41}$ is a linear electro-optic coefficient of the crystal.

22. The optical switch according to claim 19, where the absorbed portion of the stored optical energy comprises a harmonic light wave of a third harmonic type.

* * * * *